(12) United States Patent
Kumar et al.

(10) Patent No.: US 10,884,779 B2
(45) Date of Patent: Jan. 5, 2021

(54) SYSTEMS AND METHODS FOR SELECTING VIRTUAL MACHINES TO BE MIGRATED

(71) Applicant: Nutanix, Inc., San Jose, CA (US)

(72) Inventors: Abhishek Kumar, Uttarakhand (IN); Prerna Saxena, Bangalore (IN); Ramashish Gaurav, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 181 days.

(21) Appl. No.: 16/214,006

(22) Filed: Dec. 7, 2018

(65) Prior Publication Data

US 2020/0183722 A1 Jun. 11, 2020

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/4557* (2013.01); *G06F 2009/45562* (2013.01)

(58) Field of Classification Search
CPC .... G06F 9/455; G06F 9/4875; G06F 9/45558; G06F 2009/4557; G06F 9/50; G06F 9/5027; G06F 9/505; G06F 9/5083; G06F 9/5088
See application file for complete search history.

(56) References Cited

U.S. PATENT DOCUMENTS

| | | | |
|---|---|---|---|
| 8,365,180 B2 * | 1/2013 | Kawasaki | G06F 9/45516 718/104 |
| 8,549,518 B1 | 10/2013 | Aron et al. | |
| 8,560,671 B1 * | 10/2013 | Yahalom | G06F 9/5016 709/224 |
| 8,601,473 B1 | 12/2013 | Aron et al. | |
| 8,850,130 B1 | 9/2014 | Aron et al. | |
| 9,037,717 B2 | 5/2015 | Canturk et al. | |
| 9,772,866 B1 | 9/2017 | Aron et al. | |
| 9,928,092 B1 * | 3/2018 | Pagl | G06F 9/45558 |
| 10,564,998 B1 * | 2/2020 | Gritter | G06F 9/5083 |

(Continued)

OTHER PUBLICATIONS

Garcia et al.; "Policy-based Agents for Virtual Machine Migration in Cloud Data Center", IEEE 2013 (Garcia_2013.pdf; pp. 1-8) (Year: 2013).*

(Continued)

*Primary Examiner* — Hiren P Patel
(74) *Attorney, Agent, or Firm* — Foley & Lardner LLP

(57) ABSTRACT

An illustrative embodiment disclosed herein is a host device including a plurality of virtual machines and a controller virtual machine configured to compute a plurality of central processing unit (CPU) usages corresponding to the plurality of virtual machines. The controller virtual machine is further configured to compute a total usage as a sum of the plurality of CPU usages and to flag one or more outlier virtual machines of the plurality of virtual machines responsive to one or more exceeding CPU usages of the one or more outlier virtual machines being greater than a threshold usage. The controller virtual machine is further configured to assign weights to the one or more outlier virtual machines and to select, for virtual machine migration, a first outlier virtual machine of the one or more outlier virtual machines responsive to the total usage being greater than a target usage.

27 Claims, 3 Drawing Sheets

(56) References Cited

U.S. PATENT DOCUMENTS

| | | | | |
|---|---|---|---|---|
| 10,642,635 | B2* | 5/2020 | Holla | G06F 9/45558 |
| 2005/0166204 | A1* | 7/2005 | Takatsu | G06F 11/3423 |
| | | | | 718/100 |
| 2008/0028411 | A1* | 1/2008 | Cherkasova | G06F 9/5027 |
| | | | | 718/104 |
| 2011/0231680 | A1* | 9/2011 | Padmanabhan | G06F 9/5094 |
| | | | | 713/310 |
| 2013/0145364 | A1* | 6/2013 | Yang | G06F 9/5077 |
| | | | | 718/1 |
| 2014/0013072 | A1* | 1/2014 | Liu | G06F 9/5077 |
| | | | | 711/170 |
| 2014/0068608 | A1* | 3/2014 | Kulkarni | G06F 9/5083 |
| | | | | 718/1 |
| 2015/0052528 | A1* | 2/2015 | French | G06F 9/4856 |
| | | | | 718/1 |
| 2015/0331703 | A1* | 11/2015 | Kelly | G06F 9/455 |
| | | | | 718/1 |
| 2015/0370594 | A1* | 12/2015 | Ghosh | G06F 9/45533 |
| | | | | 718/1 |
| 2016/0070601 | A1* | 3/2016 | Yamamoto | G06F 9/5077 |
| | | | | 718/105 |
| 2016/0170791 | A1* | 6/2016 | Huh | G06F 9/5088 |
| | | | | 718/1 |
| 2017/0147399 | A1* | 5/2017 | Cropper | G06F 9/5083 |
| 2018/0285169 | A1* | 10/2018 | Noguchi | G06F 9/5088 |
| 2019/0278626 | A1* | 9/2019 | Kodama | G06F 1/3206 |
| 2019/0391836 | A1* | 12/2019 | Higuchi | G06F 9/5088 |

OTHER PUBLICATIONS

Wood et al.; "Black-box and Gray-box Strategies for Virtual Machine Migration"; University of Massachusetts Amherst; USENIX Symposium 2007 (wood_2007.pdf; pp. 229-242) (Year: 2007).*

Cano, Ignacio, et al. "Curator: Self-Managing Storage for Enterprise Clusters" (Mar. 27, 2017), from https://www.usenix.org/conference/nsdi17/.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

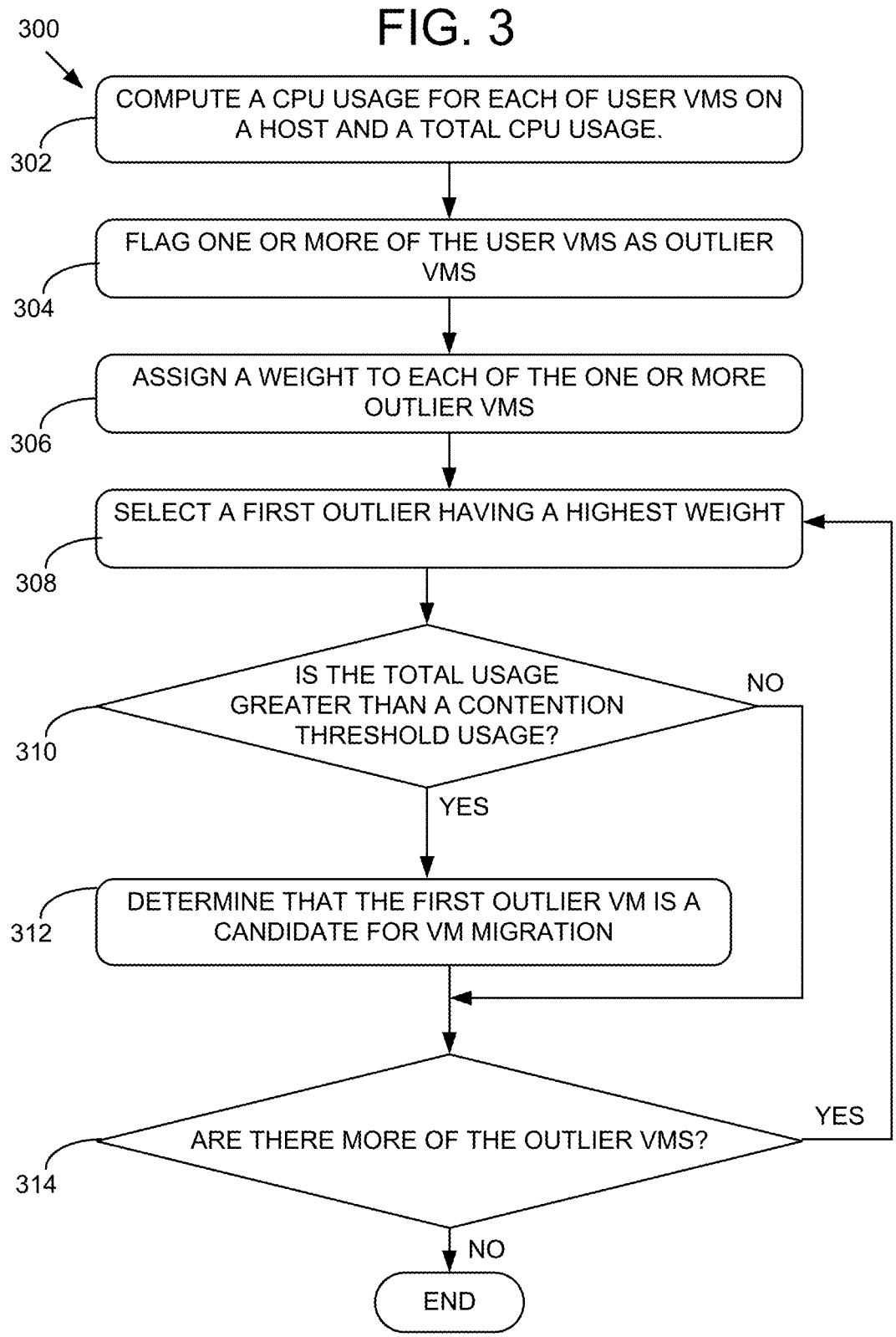

SYSTEMS AND METHODS FOR SELECTING VIRTUAL MACHINES TO BE MIGRATED

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource usage and performance efficiency. However, the present day virtual computing systems have limitations due to their configuration and the way they operate.

SUMMARY

Aspects of the present disclosure relate generally to a virtualization environment, and more particularly to a method of selecting VMs for migration. Technical solutions benefit by improving network bandwidth and efficiently using hardware resources.

An illustrative embodiment disclosed herein is a host device including a plurality of virtual machines and a controller virtual machine. The controller virtual machine is configured to compute a plurality of central processing unit (CPU) usages. Each of the plurality of CPU usages corresponds to one of the plurality of virtual machines. The controller virtual machine is further configured to compute a total usage as a sum of the plurality of CPU usages. The controller virtual machine is further configured to flag one or more outlier virtual machines of the plurality of virtual machines responsive to one or more exceeding CPU usages of the one or more outlier virtual machines being greater than a threshold usage. Each of the one or more exceeding CPU usages corresponds to one of the one or more outlier virtual machines. The controller virtual machine is further configured to assign weights to the one or more outlier virtual machines. The controller virtual machine is further configured to select, for virtual machine migration, a first outlier virtual machine of the one or more outlier virtual machines responsive to the total usage being greater than a target usage.

Another illustrative embodiment disclosed herein is a method including computing, by a controller virtual machine, a plurality of central processing unit (CPU) usages of a plurality of virtual machines. Each of the plurality of CPU usages corresponds to one of the plurality of virtual machines. The method further includes computing, by the controller virtual machine, a total usage as a sum of the plurality of CPU usages. The method further includes flagging, by the controller virtual machine, one or more outlier virtual machines of the plurality of virtual machines responsive to one or more exceeding CPU usages of the one or more outlier virtual machines being greater than a threshold usage. Each of the one or more exceeding CPU usages corresponds to one of the one or more outlier virtual machines. The method further includes assigning, by the controller virtual machine, weights to the one or more outlier virtual machines. The method further includes selecting, by the controller virtual machine, for virtual machine migration, a first outlier virtual machine of the one or more outlier virtual machines responsive to the total usage being greater than a target usage.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 is an example method for selecting user VMs to be migrated, in accordance with some embodiments of the present disclosure.

Figure 1:
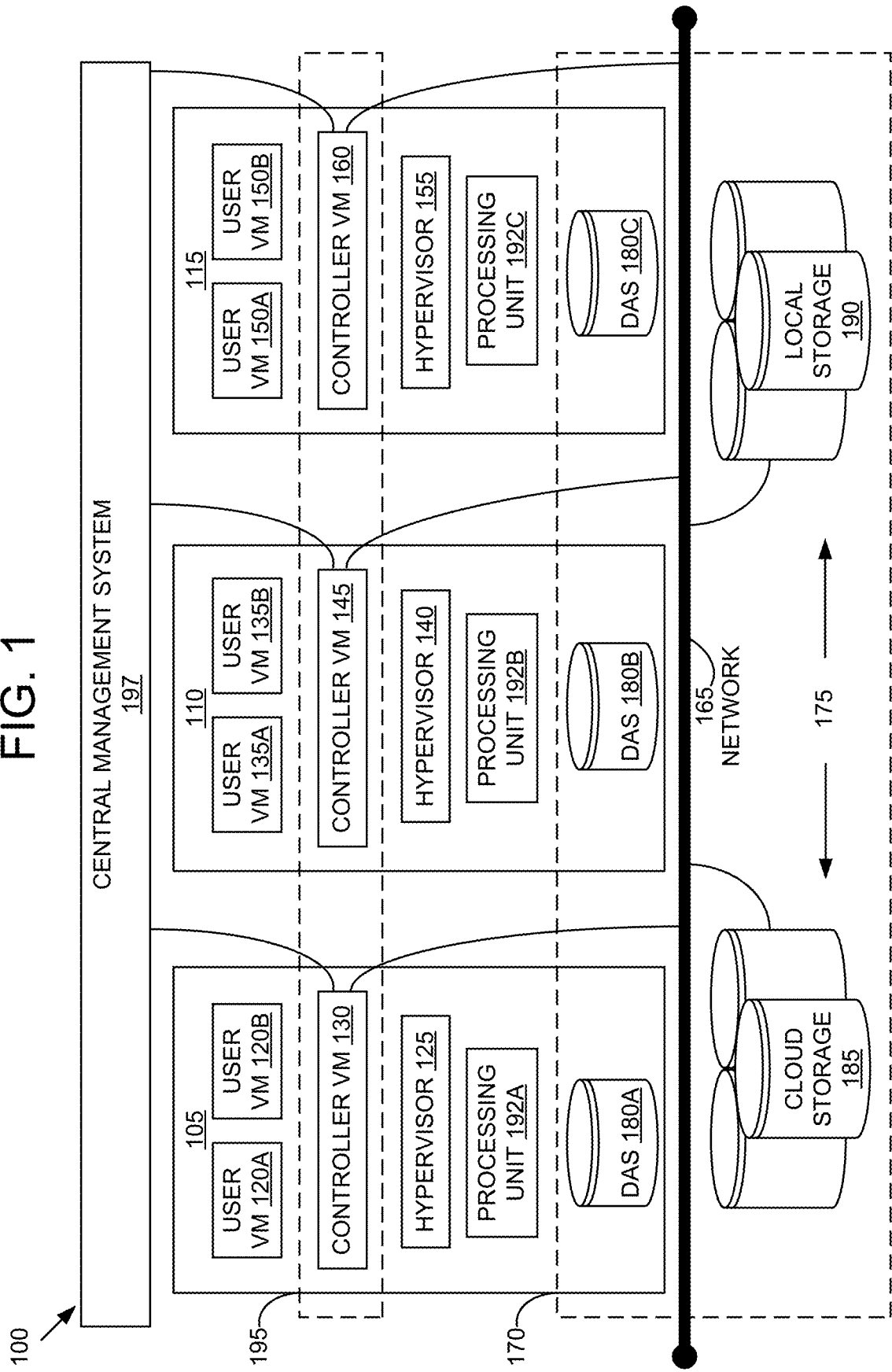
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Multiple virtual machines ("VMs"), which are running on a given host, may share, via a hypervisor of the host, underlying physical central processing units ("CPUs"). There may be contention for the CPUs such that some of the VMs requesting CPUs may wait to use the CPUs. Cluster schedulers may take the current CPU consumption of individual VMs as a heuristic to migrate VMs from the host. The VM with a maximum current CPU usage at the instant the VM faces resource contention is the one which is chosen to be evicted from the host. This is not accurate because the CPU usage of a candidate VM, e.g. VM1, may drop as soon as it is migrated. At the same time, the CPU usage of another VM, e.g. VM2, may peak on the host after VM1 is migrated, leading the cluster scheduler to identify VM2 as a second candidate to be migrated. Such an approach will lead to too many VM migrations.

One technical challenge is reducing CPU contention. CPU contention may result in VM workloads taking longer to complete. CPU contention may also be an indication that hardware resources such as CPUs on other hosts are idle and VMs are not being properly assigned to those other hosts. Another technical challenge is minimizing the number of times CPU contention occurs in the future. Every time a CPU contention is detected, cluster schedulers or their equivalents run the VM migration selection process. The migration selection process may involve requests and responses between different hosts, different clusters, and different data centers. Too many occurrences of CPU contention may result in a reduction in network bandwidth. Another technical challenge is to reduce the number of computations needed to determine whether a VM is to be migrated. By expending hardware resources on these computations, the hardware resources cannot be used to process VM workloads, which may contribute a delay in the time needed to process VM workloads.

The disclosure described herein proposes systems and methods for selecting VMs to be migrated. The disclosure includes a technical solution to the technical challenge of reducing CPU contention when it is discovered and simultaneously minimizing the number of future CPU contention occurrences. The disclosure applies machine learning to predict the CPU usage of each VM on the host, based on historical data on its past CPU usage. Using machine learning, it is possible to derive that, for a given look-ahead period, an individual VM's CPU usage in the future, and by extension, a host's total CPU usage in the future, may be estimated. Then, the system can make a determination not only of which host has CPU contention, but which VM can be migrated so that less CPU contentions occur in the future. This can result in an improvement of network bandwidth.

The disclosure includes a technical solution to the technical challenge of reducing the number of computations needed to determine whether a VM is to be migrated. First, for each of the VMs in the host, the system selects only those VMs whose maximum CPU usage in the look-ahead interval is greater than a threshold. Each of the subset of VMs selected is assigned a different weight proportional to how long within the look-ahead interval the given VM's CPU is above the threshold. Next, in an iterative process, the system selects, in order of their assigned weights, one or more VMs to migrate to another host until a target is met. By selecting only a subset with a specific CPU usage profile before performing the iterative process, the system greatly reduces the number of computations needed to select one or more VM candidates for migration. Reducing the number of computations may lead to more available resources, thus reducing the number of resources required to run a datacenter and/or reducing the length of time for completing VM workloads. In some embodiments, the threshold may be varied to optimally balance between the effectiveness of migration selection and the minimization of the number of computations for migration selection.

Virtualization Technology and Environment

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (depicted as local storage 190 in FIG. 1). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure. Some additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including central processing unit (CPU), memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource usage and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfil the input/output request (and/or request another component within the virtual computing system 100 to fulfil that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Virtual Machine Migration Selection

Figure 2:
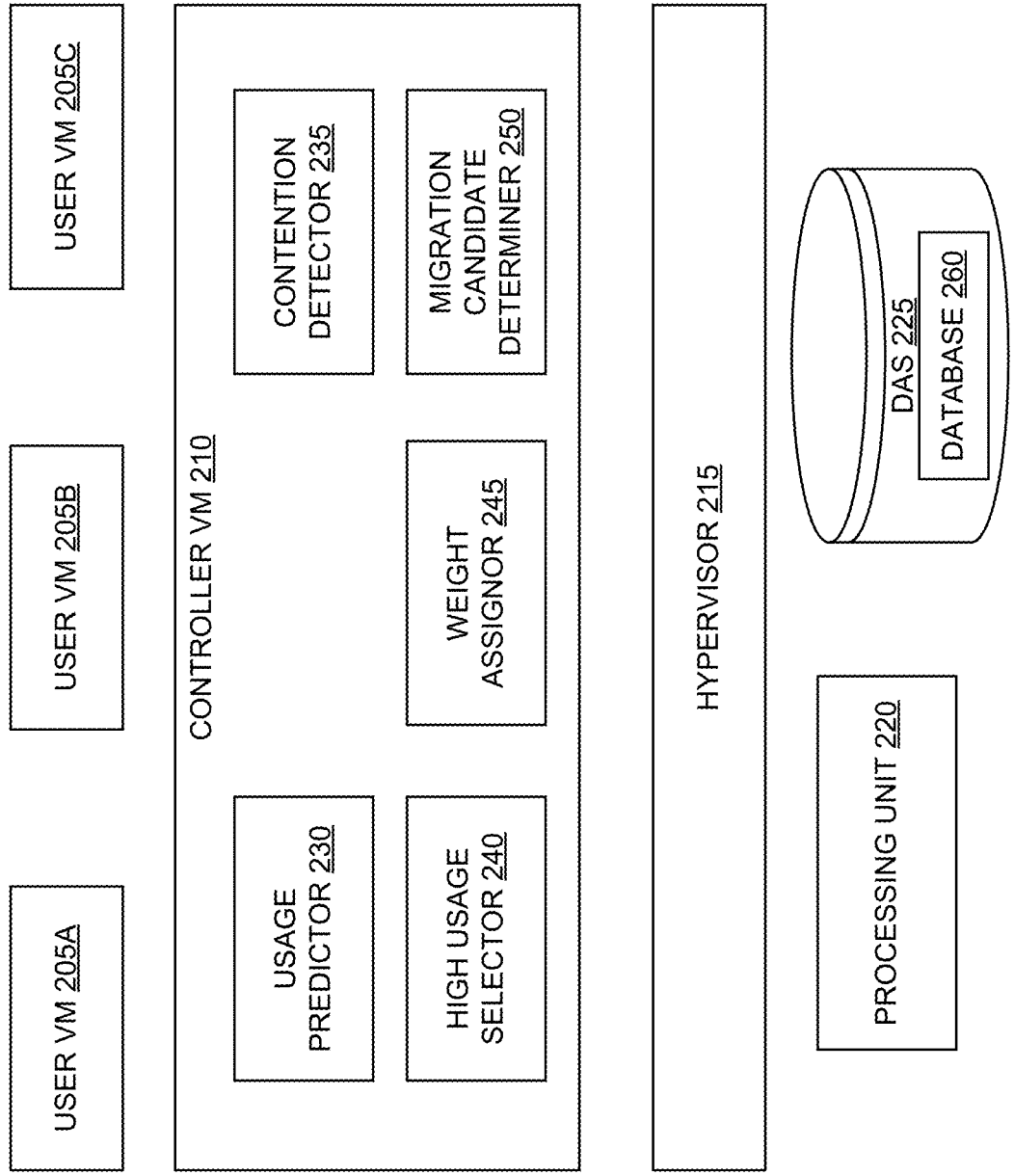
FIG. 2 is an example block diagram of a host for selecting virtual machines to be migrated, in accordance with some embodiments of the present disclosure.

Referring now to FIG. 2, a host 200 for selecting virtual machines to be migrated is shown. In brief overview, the host 200 may include a user VM 205A, a user VM 205B, a user VM 205C, a controller VM 210, a hypervisor 215, a processing unit 220 and a DAS 225. The controller VM 210 may include a usage predictor 230, a contention detector 235, a high usage selector 240, a weight assignor 245, and a migration candidate determiner 250. The DAS 225 may include a database 260. The host 200 may be an instance of the node 105 described with respect to FIG. 1. The user VM 205A, the user VM 205B, and the user VM 205C are collectively referred to herein as user VMs 205. The user VMs 205 may be instances of user VM 120A, user VM 120B, and the like, described with respect to FIG. 1. The controller VM 210 may be an instance of the controller VM 130 described with respect to FIG. 1. The hypervisor 215 may be an instance of the hypervisor 125 described with respect to FIG. 1. The processing unit 220 may be an instance of the processing unit 192A described with respect to FIG. 1. The DAS 225 may be an instance of the DAS 180A described with respect to FIG. 1. Although three user VMs are shown (e.g., a user VM 205A, a user VM 205B, a user VM 205C) are shown in the host 200, in other embodiments, greater than or fewer than three user VMs may be used. Although one processing unit (e.g. the processing unit 220) and one DAS (e.g. the DAS 225) are shown in the host 200, in other embodiments, greater than one processing unit and/or one DAS may be used in the host 200.

The hypervisor 215 may be configured to schedule allocation of hardware resources such as CPU resources (e.g. the processing unit 220) of an underlying hardware computer (e.g. the host 200) across multiple user VMs 205. The hypervisor 215 may be configured to schedule by allocating time slices (e.g. clock cycles) of the processing unit 220 to the user VMs. For example, the hypervisor 215 may allocate the processing unit 220 to the user VM 205A for a first time slice from t=0 to t=10 and to the user VM 205B for a second time slice from t=10 to t=20.

The controller VM 210 may include a usage predictor 230. The usage predictor 230 may be configured to observe, for each of the user VMs 205, a scheduling state once in every sampling period (e.g. N clock cycles). The clock may be implemented in hardware (e.g. a piezoelectric crystal oscillator or the processing unit 220). In some embodiments, the sampling period is fixed. The scheduling state that is observed may be at least one of a CPU usage state, a CPU steal state, and a CPU idle state. The CPU usage state may be a state wherein a first user VM (e.g. the user VM 205A) of the user VMs 205 uses one of the CPU resources. The CPU steal state may be a state wherein the first user VM is deprived of running on a CPU when it was in fact entitled to. If the scheduling state is not either of the CPU usage state or the CPU steal state, then the scheduling state may be the CPU idle state. The observed scheduling state may reflect a VMs current CPU activity (e.g. using, waiting, or idle) or a VMs activity during a previous sampling period.

The usage predictor 230 may be configured to track, for each of the user VMs 205, the scheduling states that fall within an observation time window. The observation time window may span multiple time samples of the observed scheduling states. In other words, the observation time window may be multiple sampling periods in length and the length may be defined as having a start time and an end time. The start time and the end time may have a fixed timing relationship to the most recent sample (e.g. the observation time window moves with respect to the observed scheduling states as time progresses).

The usage predictor 230 may be configured to compute, for each of the user VMs 205, scheduling statistics as a function of the scheduling states that fall within the observation time window. The scheduling statistics may include CPU usage, CPU read, CPU idle for each of the user VMs 205 for each sampling period. The CPU usage may be an amount of time that the first user VM uses one of the CPU resources. The CPU steal may be an amount of time that the first user VM was deprived of running on a CPU when it was in fact entitled to. The CPU idle may be an amount of time that the first user VM is not using or waiting for any of the CPU resources. The CPU usage, the CPU steal, the CPU idle may be represented as units of time (e.g. nanoseconds), units of percentage of time (%), or ratios (unit-less).

Each of the scheduling statistics includes an array of scheduling statistical samples that fall within a statistical time window. For example, a CPU usage is an array of CPU usage samples. Each scheduling statistical sample will be associated with a different time instance in the statistical time window and the time instances are spaced one sampling period apart. The computation may be performed once for every sampling period. The statistical time window moves with respect to the statistical scheduling samples as time progresses The usage predictor 230 may be configured to store the scheduling statistics and/or the scheduling states in a database. The database may include the database 260. The usage predictor 230 may be configured to store, as data entries in the database a number of most recent scheduling statistical samples which span the statistical time window. When a most recent scheduling statistical sample is computed, the usage predictor 230 may write the most recent scheduling statistical sample to one or more of the addresses in the database. Responsive to computing the most recent scheduling statistical sample, the usage predictor 230 may be configured to determine whether all addresses allocated for storing scheduling statistical samples have scheduling statistical samples stored thereon. Responsive to determining that all addresses allocated for storing scheduling statistical samples have scheduling statistical samples stored thereon, the usage predictor 230 may be configured to overwrite addresses of a data entry having the least recent scheduling statistical sample. The usage predictor 230 may be configured to overwrite the addresses with the most recent scheduling statistical sample. In some embodiments, the database is in a cache of the processing unit 220.

The CPU usage may be an observed CPU usage, a desired CPU usage, or both. The observed CPU usage may be computed as a ratio of a number of CPU usage states in the observation time window and a number of scheduling states in the observation time window. For example, At t=0, the first user VM has a CPU steal state, at t=5 the first user VM has a CPU usage state, and at t=10 the first user VM has a CPU idle state. At t=5, the controller VM 210 may compute the observed CPU usage as 50%, the CPU idle as 0%, and the CPU steal as 50% for a first observation time window from t=0 to t=5. At t=10, the controller VM 210 may compute the observed CPU usage as 50%, the CPU idle as 50%, and the CPU steal as 0% for the first observation time window from t=5 to t=10. The desired CPU usage may be computed as a ratio of a number of CPU usage states in the observation time window and a sum of a number of CPU usage states and a number of CPU idle states. Thus, for the previous example, the controller VM 210 may compute the desired CPU usage as 100% at t=5 and 50% at t=10.

The desired CPU usage may be computed in alternative ways. For example, the desired CPU usage may be computed as a ratio of a number of CPU usage states in the observation time window and a difference of a number of scheduling states and a number of CPU steal states. Also, the desired CPU usage may be computed as a ratio of the observed CPU usage to a sum of the observed CPU usage and the CPU idle. Also, the desired CPU usage may be computed as a ratio of the observed CPU usage to a difference of the length of the statistical time window (or 100% or the integer 1, depending on the units of CPU steal) and the CPU steal. The desired CPU usage may be different than the observed CPU usage when there is at least one CPU steal state in the observation time window.

The scheduling statistics may include historical scheduling statistics, look-ahead scheduling statistics, or both. Historical scheduling statistics are scheduling statistics about a VMs' CPU activity in the past. Look-ahead scheduling statistics are scheduling statistics about the VMs' CPU activity in the future. For example, a CPU usage may include a historical CPU usage, a look-ahead CPU usage, or both. Historical scheduling statistics may be computed directly from the scheduling states, as described in the preceding paragraphs. The statistical time window for historical scheduling statistics may be referred to as a historical time window. The statistical time window for look-ahead scheduling statistics may be referred to as a look-ahead time window.

The usage predictor 230 may be configured to predict look-ahead scheduling statistics in the look-ahead time window based on processing the historical scheduling statistics that fall within the historical time window. The usage predictor 230 may be configured to use machine learning to predict the look-ahead scheduling statistics. The machine learning may include a Kohonen neural network or the like. In some embodiments, the usage predictor 230 may be configured to predict look-ahead scheduling statistics at a rate of once per sampling period. In some embodiments, the length of look-ahead window is a fraction (e.g. one half) of the length of historical time window. For example, to determine look-ahead scheduling statistics for a next hour, the usage predictor 230 may be configured to process the historical scheduling statistics for a last two hours. Look-ahead scheduling statistical samples may be predicted for a plurality of future times within the look-ahead window.

The controller VM 210 may include the contention detector 235. The contention detector 235 may be configured to detect resource contention within the statistical time window. As used herein, resource contention (herein referred to as "contention") may be defined as a state during which the CPU usage is above a contention threshold usage. Contention on the host 200 may result in workloads running on the user VMs 205 taking more CPU cycles to complete. The contention threshold usage may be an amount or a percentage. The contention detector 235 may be configured to receive the contention threshold usage from an input device (e.g. keyboard or mouse) associated with the controller VM 210 or from another block such as the central management system 197 described with respect to FIG. 1. The contention detector 235 may be configured to compute a total CPU usage as a sum of the CPU usages of all of the user VMs on the host (e.g. the user VMs 205). Responsive to determining that the total CPU usage is above the contention threshold usage, the contention detector 235 may detect contention. The contention detector 235 may be configured to run responsive to a most recent CPU usage being computed or at a pre-determined time interval. The contention detector 235 may be configured to run responsive to a system alert (e.g. a pre-determined number of workloads being requested or a pre-determined number of CPU resources requested).

The controller VM 210 may include a high usage selector 240. The high usage selector 240 may be configured to select a subset of the user VMs 205 (referred to herein as "outlier VMs") based on the CPU usages of the outlier VMs. The high usage selector 240 may be configured to select a user VM (e.g. the user VM 205A) as one of the outlier VMs responsive to determining that the CPU usage of the user VM is greater than an outlier threshold CPU usage (e.g. at least one of the user VM's CPU usage samples within the statistical time window is greater than the outlier threshold CPU usage). The high usage selector 240 may be configured to receive the outlier threshold CPU usage from the input device associated with the controller VM 210 or from another block such as the central management system 197 described with respect to FIG. 1. The high usage selector 240 may be configured to determine or adjust the outlier threshold CPU usage based on criteria. The criteria may include an amount or percentage of the user VMs 205 selected as the outlier VMs. In some embodiments, the amount or percentage of the user VMs 205 that were selected as outlier VMs in previous selections is stored. The criteria may include computing an average or peak or some other function of the amount or percentage of the user VMs 205 historically selected as the outlier VMs. The criteria may include how often or for what percentage of time the contention detector 235 is detecting contention within a pre-determined time interval.

The controller VM 210 may include a weight assignor 245. The weight assignor 245 may be configured to assign a weight to each of the outlier VMs. The weight assignor 245 may be configured to assign a weight proportional to (or as some function of) a number of CPU usage samples, for a given outlier VM within the statistical time window, being greater than the outlier threshold CPU usage. The weight assignor 245 may be configured to assign a weight in proportion to a difference between a peak CPU usage sample of the CPU usage samples and the outlier threshold CPU usage. The weight assignor 245 may be configured to assign a weight in proportion to a difference between an average CPU usage of the CPU usage samples and the outlier threshold CPU usage. The average may be computed for all the CPU usage samples in the statistical time window or only for the CPU usage samples in the statistical time window which exceed the outlier threshold CPU usage. The weight assignor 245 may be configured to assign a weight as a function of a combination of the aforementioned metrics. The weight assignor 245 may be configured to assign a weight that is an average of two or more weights based on the aforementioned metrics. In some embodiments, the weight assignor 245 is configured to rank the outlier VMs based on some or all of the aforementioned metrics.

The controller VM 210 may include the migration candidate determiner 250. The migration candidate determiner 250 may be configured to determine whether an outlier VM is a candidate for migration. The migration candidate determiner 250 may be configured to iterate the determination once for each of the outlier VMs. As used herein, an outlier VM associated with a current iteration is referred to as an outlier VM under test. In some embodiments, the migration candidate determiner 250 may be configured to select outlier VMs in order of the weights assigned to the outlier VMs by the weight assignor 245. The migration candidate determiner 250 may be configured to compute the total CPU usage as a sum of the CPU usages of all of the user VMs in the host. In a first iteration, the migration candidate determiner 250 may be configured to receive the total CPU usage previously computed by the usage predictor 230. In some embodiments, the migration candidate determiner 250 is configured to compute a base CPU usage. In some embodiments, the base CPU usage is computed as a difference of the total CPU usage and the outlier VM under test. The total CPU usage may be compared to the base CPU usage. If the base CPU usage is less than the total CPU usage, then the migration candidate determiner may migrate the outlier VM under test. In some embodiments, responsive to determining that at least one total CPU usage sample (within the statistical time window) of the total CPU usage exceeds the contention threshold usage, the migration candidate determiner 245 is configured to determine that the outlier VM under test is a migration candidate. In some embodiments, after every iteration, the migration candidate determiner 250 re-computes the total CPU usage as a sum of the CPU usages of all of the user VMs in the host except any of the outlier VMs previously determined to be candidates for migration. In some embodiments, responsive to performing iterations for all of the outlier VMs, all of the migration candidates are migrated to other hosts. In some embodiments, responsive to performing iterations for all of the outlier VMs, a subset of the migration candidates are migrated to other hosts. Each of the subset of migration candidates may have the highest assigned weights among the assigned weights of all of the migration candidates.

Each of the elements or entities of the virtual computing system 100 and the host 200 (e.g. the controller VM 210, the usage predictor 230, the contention detector 235, the high usage selector 240, the weight assignor 245, and the migration candidate determiner 250) is implemented using hardware or a combination of hardware or software, in one or more embodiments. For instance, each of these elements or entities can include any application, program, library, script, task, service, process or any type and form of executable instructions executing on hardware of the host 200. The hardware includes circuitry such as one or more processors (e.g. the processing unit 220) in one or more embodiments. Each of the one or more processors is hardware.

Although described with respect to the host 200, the systems and methods described herein may be applied to clusters or datacenters without departing from the spirit and the scope of the disclosure.

Referring now to FIG. 3, an example method 300 for selecting user VMs to be migrated is shown. The method 300 for selecting user VMs to be migrated may be implemented using, or performed by, the components of the host 200 detailed herein with respect to FIG. 2. Additional, fewer, or different operations may be performed in the method 300 depending on the embodiment. In brief overview of the method 300, a controller VM computes a CPU usage for each of user VMs on a host and a total CPU usage (302). The controller VM flags one or more of the user VMs as outlier VMs (304). The controller VM assigns a weight to each of the outlier VMs (306). The controller VM selects a first outlier VM of the outlier VMs having a highest weight (308). The controller VM determines whether the total usage is greater than a contention threshold usage (310). Responsive to determining that the total usage is greater than the contention threshold usage, the controller VM determines that the first VM is a candidate for VM migration (312). The controller VM determines whether there are more of the outlier VMs (314).

At operation 302, a controller VM (e.g. the controller VM 210) computes a CPU usage for each of the user VMs (e.g. the user VMs 205) on a host (e.g. the host 200). Computing the CPU usage may include computing an amount or percentage of time a user VM is using a CPU in a time window. Computing the CPU usage may include computing an amount or percentage of time a user VM would theoretically use the CPU in a time window if it were not waiting for other VMs to finish using the CPU. In some embodiments, computing the CPU usage includes predicting the CPU usage in a look-ahead time window. In some embodiments, computing the CPU usage is includes computing the CPU usage in a historical time window.

At operation 304, the controller VM flags one or more of the user VMs as outlier VMs. Flagging the one or more of the user VMs as outlier VMs may include comparing the CPU usage of each of the user VMs to an outlier threshold usage. Flagging a first user VM of the one or more user VMs as an example outlier VM of the one or more outlier VMs may be responsive to determining that a first CPU usage of the first user VM is greater than the outlier threshold usage. In some embodiments, comparing the CPU usage of each of the user VMs to an outlier threshold usage may be responsive to detecting contention. Detecting contention may include determining that a total usage is greater than a contention threshold usage. In some embodiments, comparing the CPU usage of each of the user VMs to an outlier threshold usage may be responsive to a counter being greater than a pre-determined value. Once the counter is greater than the pre-determined value, the counter may reset to its initial value (e.g. zero).

At operation 306, the controller VM assigns a weight to each of the outlier VMs. Assigning a weight to the example outlier VM may include assigning a weight that is proportional to a number of CPU usage samples, within a time window and corresponding to the example outlier VM, being greater than the outlier threshold usage. Assigning the weight to the example outlier VM may include assigning the weight proportional to a difference between a first CPU usage sample and the outlier threshold CPU usage. The first CPU usage sample may be a highest CPU usage sample in a time window or an average of the CPU usages in the time window which exceed the threshold.

At operation 308, the controller VM selects a first outlier VM of the one or more outlier VMs having a highest weight of weights assigned to all of the outlier VMs. Selecting the first outlier VM having the highest weight may include having access to a data set of data entries. Each data entry may correspond to one of the outlier VMs. The data set may be stored in a database such as the database 260. In some embodiments, the controller VM generates the data set by selecting the outlier VM date entries from a larger data set of all of the user VM data entries. Selecting the first outlier VM having the highest weight may include sorting the data entries in an order of descending weights so, for example, the first outlier VM is at a first index and a last outlier VM with a lowest weight is at a last index. Selecting the first outlier VM having the highest weight may include selecting a current outlier VM at a current index.

At operation 310, the controller VM determines whether the total usage is greater than the contention threshold usage. Determining whether the total usage is greater than the contention threshold usage may include computing the total usage as a sum of the CPU usages of all of the outlier VMs that have not been previously selected as migration candidates. Determining whether the total usage is greater than the contention threshold usage may include using the same total usage and contention threshold usage as the total usage and the contention threshold usage used in flagging outlier VMs.

At operation 312, responsive to determining that the total usage is greater than the contention threshold usage, the controller VM determines that the first outlier VM is a candidate for VM migration. In some embodiments, responsive to determining that the total usage is greater than the contention threshold usage, the controller VM re-computes the total CPU usage. Re-computing the total CPU usage may include re-computing the total CPU command as a difference between the total CPU usage and the CPU usage of the first outlier VM. In some embodiments, the controller VM marks the data entry of the first outlier VM for deletion. The controller VM may delete the data entry upon completion of operation 314.

At operation 314, the controller VM determines whether there are more of the outlier VMs to be evaluated as migration candidates. Determining whether there are more of the outlier VMs may include determining whether the current index is the last index (e.g. by comparing the index to a size of the data set of the outlier VMs in the database). Responsive to determining that the current index is not the last index, the controller VM may increment the current index by one. Responsive to determining that there are more outlier VMs to be selected, the method 300 returns to operation 308. Responsive to determining that there are not any more outlier VMs to be selected, the controller VM or some other block may determine to which host to migrate one or more of the migration candidates to.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. A host device comprising a controller virtual machine with a processor having programmed instructions stored in memory that when executed cause the controller virtual machine to:
   determine, for each virtual machine of a plurality of virtual machines on a host, a central processing unit (CPU) usage of a plurality of CPU usages;
   determine that a sum of the plurality of CPU usages exceeds a first threshold usage;
   flag, from the plurality of virtual machines, outlier virtual machines having a CPU usage exceeding a second threshold usage;
   assign a weight to each of the outlier virtual machines based on a CPU usage-related metric, wherein each CPU usage comprises a plurality of CPU usage samples, wherein the plurality of CPU usage samples includes a plurality of CPU usage samples exceeding the second threshold usage, and wherein the weight is proportional to the plurality of CPU usage samples exceeding the second threshold usage;
   select for migration, from the outlier virtual machines, candidate virtual machines based on assigned weights until a sum of second CPU usages is less than a third threshold usage, wherein the second CPU usages include each CPU usage of a virtual machine not selected for migration; and
   migrate the candidate virtual machines.

2. The host device of claim 1, wherein the processor of the controller virtual machine having further programmed instructions to:
   sort the outlier virtual machines in a descending order of assigned weights; and
   select for migration the candidate virtual machines based on the descending order of the assigned weights.

3. The host device of claim 1, wherein each CPU usage includes a look-ahead CPU usage and wherein the processor of the controller virtual machine has further programmed instructions to predict the look-ahead CPU usage based on a historical CPU usage.

4. The host device of claim 3, wherein the historical CPU usage is within a historical time period and the look-ahead CPU usage is within a look-ahead time period, and the historical time period is greater than the look-ahead time period.

5. The host device of claim 1, wherein the processor of the controller virtual machine has further programmed instructions to detect contention on the host device.

6. The host device of claim 5, wherein flagging the outlier virtual machines comprises flagging responsive to detecting the contention on the host device.

7. The host device of claim 1, wherein flagging the outlier virtual machines comprises flagging responsive to a counter being greater than a pre-determined value.

8. The host device of claim 1, wherein each CPU usage includes an observed CPU usage.

9. The host device of claim 1, wherein each CPU usage includes a desired CPU usage calculated based on an observed CPU usage and a CPU wait time.

10. A method comprising:
 determining, for each virtual machine of a plurality of virtual machines on a host, a central processing unit (CPU) usage of a plurality of CPU usages;
 determining that a sum of the plurality of CPU usages exceeds a first threshold usage;
 flagging, from the plurality of virtual machines, outlier virtual machines having a CPU usage exceeding a second threshold usage;
 assigning a weight to each of the outlier virtual machines based on a CPU usage-related metric, wherein each CPU usage comprises a plurality of CPU usage samples, wherein the plurality of CPU usage samples includes a plurality of CPU usage samples exceeding the second threshold usage, and wherein the weight is proportional to the plurality of CPU usage samples exceeding the second threshold usage;
 selecting for migration, from the outlier virtual machines, candidate virtual machines based on assigned weights until a sum of second CPU usages is less than a third threshold usage, wherein the second CPU usages include each CPU usage of a virtual machine not selected for migration; and
 migrating the candidate virtual machines.

11. The method of claim 10, further comprising:
 sorting the outlier virtual machines in a descending order of assigned weights; and
 selecting for migration the candidate virtual machines based on the descending order of the assigned weights.

12. The method of claim 10, wherein each CPU usage includes a look-ahead CPU usage and wherein the method further comprises predicting, by the controller virtual machine, the look-ahead CPU usage based on a historical CPU usage.

13. The method of claim 12, wherein the historical CPU usage is within a historical time period and the look-ahead CPU usage is within a look-ahead time period, and the historical time period is greater than the look-ahead time period.

14. The method of claim 10, further comprising detecting contention on the host device.

15. The method of claim 14, wherein flagging the outlier virtual machines comprises flagging responsive to detecting the contention on the host device.

16. The method of claim 10, wherein flagging, by the controller virtual machine, the outlier virtual machines comprises flagging responsive to a counter being greater than a pre-determined value.

17. The method of claim 10, wherein each CPU usage includes an observed CPU usage.

18. The method of claim 10, wherein each CPU usage includes a desired CPU usage calculated based on an observed CPU usage and a CPU wait time.

19. A non-transitory computer readable media storing computer readable instructions to cause a computer to perform a process comprising:
 determining, for each virtual machine of a plurality of virtual machines on a host, a central processing unit (CPU) usage of a plurality of CPU usages;
 determining that a sum of the plurality of CPU usages exceeds a first threshold usage;
 flagging, from the plurality of virtual machines, outlier virtual machines having a CPU usage exceeding a second threshold usage;
 assigning a weight to each of the outlier virtual machines based on a CPU usage-related metric, wherein each CPU usage comprises a plurality of CPU usage samples, wherein the plurality of CPU usage samples includes a plurality of CPU usage samples exceeding the second threshold usage, and wherein the weight is proportional to the plurality of CPU usage samples exceeding the second threshold usage;
 selecting for migration, from the outlier virtual machines, candidate virtual machines based on the assigned weights until a sum of second CPU usages is less than a third threshold usage, wherein the second CPU usages include each CPU usage of a virtual machine not selected for migration; and
 migrating the candidate virtual machines.

20. The non-transitory computer readable media of claim 19, the instructions further comprising
 sorting the outlier virtual machines in a descending order of assigned weights; and
 selecting for migration the candidate virtual machines based on the descending order of the assigned weights.

21. The non-transitory computer readable media of claim 19, wherein each CPU usage includes a look-ahead CPU usage and wherein the method further comprises predicting, by the controller virtual machine, the look-ahead CPU usage based on a historical CPU usage.

22. The non-transitory computer readable media of claim 21, wherein the historical CPU usage is within a historical time period and the look-ahead CPU usage is within a look-ahead time period, and the historical time period is greater than the look-ahead time period.

23. The non-transitory computer readable media of claim 19, the instructions further comprising detecting contention on the host device.

24. The non-transitory computer readable media of claim 23, wherein flagging the outlier virtual machines comprises flagging responsive to detecting the contention on the host device.

25. The non-transitory computer readable media of claim 19, wherein flagging, by the controller virtual machine, the outlier virtual machines comprises flagging responsive to a counter being greater than a pre-determined value.

26. The non-transitory computer readable media of claim 19, wherein each CPU usage includes an observed CPU usage.

27. The non-transitory computer readable media of claim 19, wherein each CPU usage includes a desired CPU usage calculated based on an observed CPU usage and a CPU wait time.

* * * * *